United States Patent [19]

Benne et al.

[11] Patent Number: 4,726,006
[45] Date of Patent: Feb. 16, 1988

[54] DISC-SHAPED INFORMATION CARRIER AND METHOD OF MANUFACTURING IT

[75] Inventors: Karsten Benne; Hermann Koop, both of Ronnenberg; Hans Schüddekopf, Hanover, all of Fed. Rep. of Germany

[73] Assignee: Polygram International Holding B.V., Baarn, Netherlands

[21] Appl. No.: 843,466

[22] Filed: Mar. 24, 1986

[30] Foreign Application Priority Data

Mar. 29, 1985 [DE] Fed. Rep. of Germany ....... 3511712

[51] Int. Cl.⁴ .................. G11B 3/70; G11B 5/84; B44C 1/22; C03C 15/00
[52] U.S. Cl. ........................... 369/280; 156/643; 156/645; 156/654; 156/659.1; 156/663; 219/121 LM; 264/1.1; 264/220; 428/156
[58] Field of Search .............. 156/659.1, 663, 643, 156/645, 654; 219/121 LM, 121 LS; 369/272, 275, 277, 280, 282, 284; 264/1.1, 220, 1.3; 428/156, 167, 170; 346/137

[56] References Cited

U.S. PATENT DOCUMENTS 4,282,311  8/1981  Dinardo ................. 156/661.1 X
4,544,443  10/1985  Ohta ...................... 156/643

Primary Examiner—William A. Powell
Attorney, Agent, or Firm—Norman N. Spain

[57] ABSTRACT

The invention relates to disc-shaped information carriers which can be read optically in reflection and which contain an annular information zone which is bounded by a concentric inner zone and a concentric outer zone. The information carrier consists of a transparent substrate and has a readout side and an opposite side (back) which at least in the information zone has a reflective coating. The light entering the outer zone from the readout side is reflected at least partially diffusely or absorbed by the information carrier. In this way, manufacturing defects such as, for example, inclusions, inhomogeneities etc. are at least partially masked or concealed.

25 Claims, 15 Drawing Figures

U.S. Patent     Feb. 16, 1988     4,726,006
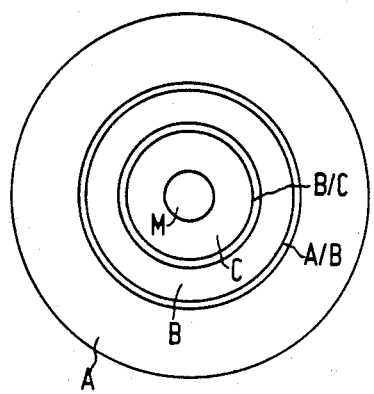
FIG.1
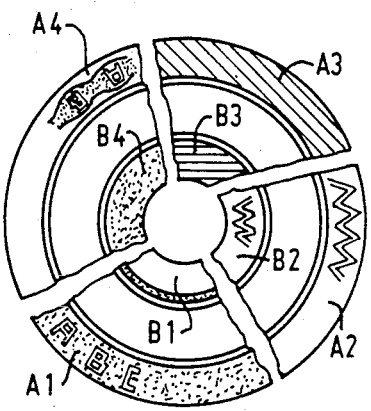
FIG.2
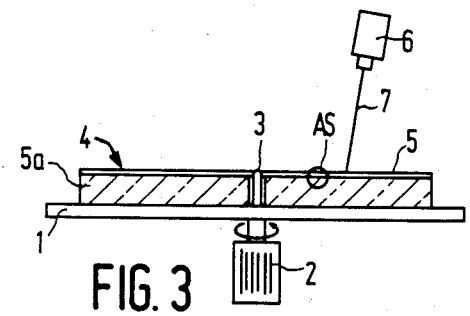
FIG.3
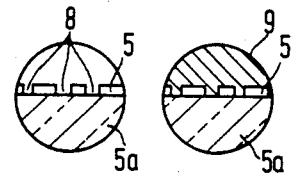 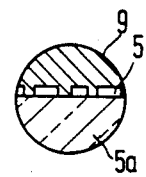
FIG.4    FIG.5
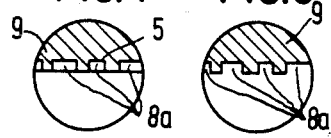 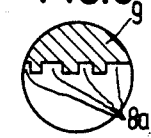
FIG.6    FIG.7
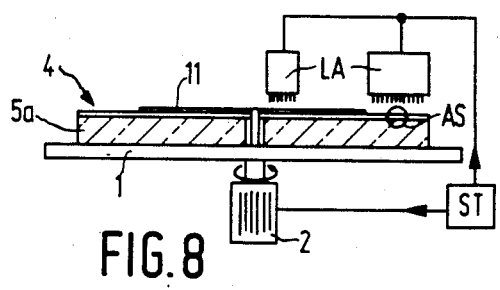
FIG.8
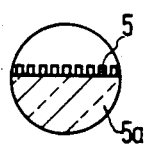
FIG.9

DISC-SHAPED INFORMATION CARRIER AND METHOD OF MANUFACTURING IT

The invention relates to a disc-shaped information carrier, for example a laser video disc (VLP) or digital audio disc (CD), which is read optically in reflection, with an annular information zone which is bounded by a concentric inner zone and a concentric outer zone, the said information carrier comprising a transparent substrate which has a readout side and an opposite side to this (back) which is provided with a reflective coating.

Disk-shaped information carriers which are read optically in reflection are available commercially, for example, as compact discs which contain digital audio information. Discs containing video signals (VLPs) and discs containing data (CD-ROMs) are also known. In addition, writable information carriers are also known in which information can be written into the reflective coating by means of a radiation beam. Such discs are used as optical storage discs.

In such disc-shaped information carriers the substrate often consists of a transparent plastic which is given a reflective coating. The plastic may consist, for example, of polycarbonate or polymethylmetacrylate. The discs are made in an injection moulding or injection-compression moulding process. In the process the actual information, or in the case of writable discs the track information or the like, is imprinted into the disc surface in the form of a microstructure on at least one side. Alternatively, it is also possible to use a flat substrate which is provided with a lacquer which hardens when irradiated with UV light and which, when still in the liquid state, is brought into contact with a die and, while hardening, takes on the microstructure present in the die. In order that the micro-information structure can be read out in reflection, the disc is coated on the back with a reflective layer.

In the mass production of the information carriers, the dies displaying the micro-information structure are usually electroplatings derived from a so-called master. Plastic dies may also be used. For the sake of simplicity, we shall speak hereinafter only of platings. For the master, a glass disc, which is coated initially with a photoresist layer, is frequently used as the substrate. This photoresist layer is exposed by means of a laser beam focussed on the layer and modulated with the information and then developed, the exposed parts usually being removed from the photoresist layer. The finished master is made electrically conductive, and then a first plating (father plating) is drawn from the master in an electrolytic bath. This father plating can be used immediately as the stamper. Usually, however, a further plating (mother plating) is first of all drawn from the father plating and further platings (daughter platings) are taken from the mother plaing, and only these daughter platings are used as stampers.

In the case of one-off manufacture or the manufacture of very small series it is possible not to record the information structure in the information carrier by means of a die but by inscribing the information carrier itself.

In the manufacture of such disc-shaped information carriers, very high demands have to be placed not only on the accuracy of the micro-information structure to be transferred to the disc but also on the homogeneity of the substrate material and the defect-free condition of the coating surfaces.

As practice shows, such defects cannot as a rule be eliminated so that a fairly substantial part of production has to be rejected. Particularly critical in this context is the outer zone of the information carrier because during manufacture inhomogeneities, in the form for example of fine air bubbles, readily occur in the outer edge areas of the material. This can occur, for example, when the information carriers are produced by injection or injection-compression moulding due to the fact that during pressing the injected material does not cool uniformly in the radial direction. It is also impossible sometimes when handling such discs during the manufacuring process to avoid surface scratches which then also often occur in the outer zone of the disc surfaces. One of the drawbacks in this situation is that, when there is a metallic reflective coating present, the mirror effect of this coating causes such defects to stand out particularly prominently to the observer.

It is a first object of the present invention to design such disc-shaped information carriers in such a way that particularly in the case of a relatively large outer zone any defects in this zone do not stand out prominently. For disc-shaped information carriers with a relatively small information zone it is often desirable to make the information carrier visually especially attractive, for example for promotion purposes. With a fully metallized back the earlier mentioned manufacturing defects however stand out particularly clearly because inclusions and defects in the substrate are reflected once again by the reflective coating and thus become especially clearly visible to the eye. It is another object of the invention to reduce the number of rejects which occur during production due to the result of the above-described defects.

The invention achieves these objects as follows: as seen from the readout side, the information carrier reflects any light falling in the outer zone at least partially diffusely and/or absorbs it at least partly, so that optical effects such as, for example, inclusions, inhomogeneities, printing on the back visible from the readout side, etc. which could adversely influence the appearance of the information carrier are at least partially masked or concealed.

In the disc-shaped information carrier of the invention the defects which occur are concealed and so become less visible or invisible. It is not necessary to reduce the occurrence of the defects themselves. The reject rate may be lower than for totally recorded discs or those with unconcealed outer zone because at least a number of the information carriers which have defects in the outer zone do not have to be included in the rejects. This represents a contribution towards increased economic efficiency in the manufacture of the information carriers even if the measures required by the invention involve increased manufacturing expenditure. In this way it is possible, particularly for information carriers with a relatively small information zone, to achieve an especially attractive optical appearance, possibly without increased unit costs.

It is planned, for example, to market compact discs with a playing time of approx. 10 to 15 min. which are to be used for promotion purposes and shall have an especially pleasing appearance. The intention is to be able to offer such compact discs at a particularly attractive price.

It may be advisable to conceal the inner zone of the information carrier also. The application of a matt finish to the inner zone is already known per se from DE-AS No. 26 39 118. Here the stamper is roughened which has the effect of imparting a kind of matt finish to the inner zone of the finished information carrier. The purpose of the roughening in this instance is to prevent impurities of the substrate compound from getting into the outer zones during pressing. It has nothing to do with masking of impurities. The roughened areas of the stamper are to prevent any solid particles which may be present from penetrating into the outer zones during pressing and the roughness profile should be chosen so as to serve the purpose of immobilizing the solid particles in the inner zone.

In one advantageous configuration, a stamper based on DE-AS No. 26 39 118 can be combined with the measures of the present invention. This has the effect (a) of reducing the occurrence of impurities in the information and outer zones and (b) of concealing any manufacturing defects present in the outer zone.

In a further configuration of the invention, provision is made for the outer zone of the information carrier on the readout and/or back to be made totally or partially matt, to be printed or be provided with at least one stick-on label.

One method known in the art is not to metallize the outer zone of the information carrier. Selective metallization of the information zone and the measures of the present invention offer a wide range of possible configurations.

For instance, when the outer zone is not metallized, an imprint can be made on the back which is also visible through the substrate from the readout side. A matt finish with possibly a lacquer on top may be applied to the back. The matt finish is then also visible from the readout side and can, in turn be used where appropriate as a background for printing applied to the outer zone on the readout side.

In the case of totally metallized information carriers, both the back and the readout side may be given a matt finish, be partially printed or provided with at least one stick-on label in the outer zone. A combination of these measures is also possible.

The measures of the present invention can also be combined with a protective coating applied to the back and comprising at least one colour, such as is known from EP patent application No. 70 031 (PHD 81-476 EP).

In order that no problems occur during the scanning of the information disc by the laser, a further refinement of the invention has provision for a transition zone between the information zone and the concentric inner and outer zones. The purpose of this zone is to prevent the laser beam from getting to the inner and outer zones during scanning.

A further refinement of the invention proposes a method of applying a matt finish to a disc-shaped information carrier whereby the matted zones of the information carrier are produced by matting the appropriate zones of either the original disc (master) intended for production of the stampers or a stamper derived from it and/or, where necessary, the surface of the blank mould half of the injection or injection-compression mould.

The application of a matt finish to the original disc or a stamper derived from it is particularly economic because this matting has only to be carried out once and does not have to be applied afresh to every finished information carrier. If several stampers are derived in succession from the master, the matt finish can be applied to one of these stampers.

The invention will now be explained in detail with the aid of the schematic drawings which show a few embodiments of the invention and in which:

FIG. 1 is a disk-shaped information carrier seen from the readout side,

FIG. 2 is an information carrier of the type of FIG. 1 showing, by way of example, different kinds and combinations of the measures of the invention.

FIGS. 3 to 7 are schematic representations of the production of a master and the platings derived from it, FIGS. 8 to 9 are schematic representations of the production of matt-finished part zones during the manufacture of a master.

FIGS. 10 to 11 are schematic representations of a further method of production of matt-finished part zones in the case of a plating derived from a master or a father or mother plating, FIG. 12 is a schematic representation of another possible way of producing matt-finished part zones in the case of a master or a plating derived therefrom, FIG. 13 is a schematic representation of the production of a matt finish for the blank mould of an injection mould used for the production of disk-shaped information carriers and FIGS. 14 and 15 are schematic representation of the production of matt-finished part areas in the case of a finished master, a plating derived from it or a disc-shaped information carrier already produced by moulding.

FIGS. 1 and 2 shows the view of the readout side of a disc-shaped information carrier which can be read optically in reflection, such as is commercially available, for example, in the form of a CD. The readout side of the disc-shaped information carrier is divided into an outer zone A, a centre zone B and an inner zone C which are separated from one another by narrow annular zones A/B and B/C. The stored information is arranged in the centre zone B in the form of a micro-information structure which may consist of a spiral track. The micro-information structure is pressed into the disc surface from the back and this side of the disc is covered with a metallic reflective coating covered by a protective lacquer coating.

The centre zone B representing an annular area is relatively narrow and indicates therefore that the stored information is sufficient approximately for a playing time of 15 to 20 min. Disk-shaped information carriers of this kind are of interest everywhere where a specified, limited information content, for instance a hit-parade record, is to be offered commercially at the most attractive price. In order that, from the point of view of pricing, the reject rates can be kept as low as possible here during manufacture, the outer zone A and the inner zone C have a matt finish which advantageously conceals any defects and surface inhomogeneities which may be present.

To achieve this concealment, the inner zone C and the outer zone A of the information carrier shown in FIG. 1 are given a matt finish. The matt finish can be applied to the information carrier itself by one of the measures described or to the master or a stamper derived from it.

For the purpose of demonstrating some of the possible combinations of the concealment measures, the information carrier in FIG. 2, also seen from the readout side, is divided into four sectors; each of these sectors illustrating the many possible combinations. Naturally, such a subdivision into sectors, which is only for demonstration purposes here, is not normally undertaken.

In the first sector the inner zone B1 is totally metallized as is normally the case with compact discs. The outer zone A1 is also metallized, but is additionally given a matt finish on the readout side shown. Lettering is printed on this matt surface. Thus, any visually prominent manufacturing defects present in outer zone A1 are reliably concealed.

This also applies to the other sectors which, by way of example, show:

A2, B2: patterns, pictures, ornamental designs or the like printed on the inner and outer zones. The background may, for example, be another colour imprint or a matt finish.

A3, B3: Inner and outer zones have been colour-printed or show a colour imprint through from the other side.

A4: The outer zone is metallised on the back and is partially in the form of a matt structure on the read out side. Space is left in this matt structure for characters or symbols as well as around it. These parts therefore show the reflective back.

B4: The inner zone has a matt finish.

The colour imprints on inner and/or outer zones of the information carrier can be produced, for example, by an off-set printing method, such as currently in use to produce imprints on the back of compact discs.

To make it easier to understand the possible ways of manufacturing disc-shaped information carriers with matt-finished part zones, a short description will be given first of all, using FIG. 3, of the manufacture of the stampers required for the injection moulding.

FIG. 3 shows a master 4 on a turntable 1, which is rotated by a drive 2 having a spindle 3. The master 4 is in the form of a glass disc 5a which is covered on its top surface with a photoresist coating 5. Arranged above the glass disc 5a with the photoresist coating 5 is a laser source 6 the beam 7 of which is focussed on the photoresist coating 5 and is modulated in intensity by the information to be stored.

During the rotating movement of the turntable 1, the modulated laser beam 7 writes a helical exposure track into the photoresist coating which is then developed, the exposed parts being dissolved away from the photoresist coating. This completes the manufacture of the master 4. A small section AS illustrated in FIG. 3 will be used, in conjunction with FIGS. 4 to 7, to explain in greater deal the procedures which then follow.

FIG. 4 shows in section AS the developed photoresist 5 which reveals the surface of the glass disc 5a at the exposed places 8. After the master 4 is made electrically conductive on the side of the developed photoresist coating, a father plating 9 is taken of master 4, as shown by the section AS in FIG. 5. After the father plating 9 is separated from the glass disc 5a as shown in FIG. 6, residues of the developed photoresist coating 5 must at this stage be removed from the recessed 8a of the father plating 9. Finally, FIG. 7 shows the finished father plating 9 in section AS.

The father plating 9 can already be used as a stamper. For the production of several stampers, however, it is usual to take a further mother plating from this father plating 9 and then to produce the platings which represent the actual stampers.

In order to achieve a matt finish of the outer zone A and, where necessary, of the inner zone C of the readout side of the finished information carrier, it is possible to undertake appropriate matt finishing of part zones of the master, of a plating, or of the finished moulded information carrier itself.

A preferred method is to utilize for the desired matt finishing the photoresist coating 5 which is present for the information storage during the production of the master 4. All that is needed is to use the laser 6, as shown in FIG. 3, to treat the inner and outer zones of the photoresist coating 5 in a similar way as it is used to treat the centre zone containing the actual information. For this purpose the laser 6 is modulated in intensity with suitable matt-finishing information. After the various exposure operations have been completed, the photoresist coating 5 is then developed in one operation and the father plating 9 is taken from the finished master as has already been explained with the aid of FIGS. 4 to 7.

It is also possible to produce in a similar manner a blank stamper from a blank master, with which the desired matt finish is moulded on to the read out side of the substrate.

The matrix structure of the photoresist coating brought about the matt-finishing information can have very different configurations. A preferred matrix structure is a uniform matrix of holes which have a hole diameter and an interhole spacing of the order of a few $\mu$ with a hole depth of approx. $1\mu$.

FIG. 8 shows another possibility in conjunction with a master 4 whereby during the exposure of the photoresist coating 5 by the modulated light beam the zones to be matt-finished are exposed simultaneously or immediately after by means of light configurations LA in the form of a fine light matrix. During exposure the centre zone of the master is covered by a mask. The fine matrix exposure by the lighting configurations LA is controlled by a control unit ST as a function of the control of the drive 2 for the turntable 1. The section AS indicated in FIG. 8 as per FIG. 3 is illustrated by the section shown in FIG. 9. In accordance with FIG. 4, FIG. 9 shows the fine light matrix in the form of the developed photoresist coating 5 which within the framework of this fine matrix exposes the surface of the glass disc 5a in the form of a dot matrix. The matt finish thus obtained of the outer zone A and the inner zone C in FIG. 1 is transferred to the platings when these are derived from the master 4 and is then also present on the disc information carrier when this has been moulded.

The matt finish in the outer zone A and in the inner zone C on the readout side and/or back of a finished information carrier of the type shown in FIG. 1 can also be achieved by mounting the plating 90, derived from a master 4 or a father or mother plating, on the turntable 1 and by producing a matrix of fused spots in the outer zone A and inner zone C in the form of a circular or helical track by means of a high-energy laser beam 7 focussed on the plating surface which has a uniform intensity modulation necessary for the desired matrix formation. FIG. 11 shows the representation of the section corresponding to section AS for the plating 90 matt-finished in this way. The surface of the plating 90 is only fused, and the fused holes 10 have a small build-up on both sides.

A further possibility is shown in FIG. 12 in which the glass disc 5a of the finished master 4 in the centre zone B as per FIG. 1 is fitted with a cover mask 11 and the inner zone C and the outer zone A are sprayed with a matt lacquer by the nozzles 12 and 13 while the glass disc 5a rotates.

It should be stated that the embodiment as illustrated in FIG. 12 for a master 4 can be similarly applied to platings derived from the master, as well as to information carriers which have already been moulded.

In the manufacture of information carriers which can only be read from one side and in which therefore the information has also be imprinted only from one side into the surface of the information carrier by a stamper, it is normally possible to do without any special stamper for the second half of the mould. FIG. 13 shows such a mould. The top half 15 of the mould fixed to a lifting plate 14 has a die 16 which is clamped to the upper mould half across its lateral tapered edge by means of a clamping ring 17. Similarly, the lower mould half 18 is fixed to a generally stationary plate 19. It has no stamper and represents a so-called blank mould half, the actual contact surface 20 of which is mechanically roughened, for example, by grinding so that the desired matt effect appears on the back or label side of the information disc. For the roughening it is possible, as is indicated in FIG. 13, to use a grinding disc 21 which can be freely moved across the contact surface 20 of the lower half of the press mould 18.

When a matt lacquer is used to apply a matt finish to the prescribed part zones, it is possible to utilize an off-set printing method. FIGS. 14 and 15 show this printing method when applied to the outer zone A and the inner zone C as per FIG. 2. The disc which is to be printed—which here again as an example only is a glass disc 5a of a master 4—is printed in the central zone by means of a print cushion 23 which can execute a lifting-translation movement. The print cushion 23 first of all picks up the matt lacquer from a lacquer store located outside the glass disc 5a, then travels across the glass disc 5a and then delivers the lacquer to the inner zone C in an axial downward motion. A similar representation for the deposition of the matt lacquer in the outer zone A is shown in FIG. 15. In this case the print cushion 24 has an annular shape matched to the outer zone so that the outer zone A can be printed in one operation.

The invention can be used advantageously in the mass production of disc-shaped optically readable information carriers in every situation where the finished information carrier has relatively large part zones the mirror surfaces of which are not required for the reading out of information in reflection. Its application is particularly advantageous for the manufacture of inexpensive CDs of relatively short playing time. The information carriers may have an attractive appearance not only on the back but also when viewed from the read-out side. There are many possibilities for creative decoration using matt-printed parts, reflecting parts and printed parts of any required colour, single or in any conceivable combination. Since the substrate is transparent, the matt-finished or otherwise decorated parts may be on the face of the substrate or may be seen through the substrate in whole or in part, again in any conceivable combination. Instead of or in combination with decoration, readable information may be provided readable from the read-out side of the record.

In the inner and outer zones reflective layers may be used that are not chosen for their optical reflective properties but only for their decorative properties and may have a colour different from the silver colour used in the information zone.

What is claimed is:

1. A disc-shaped information carrier, optically readable in reflection, provided with an annular information zone bounded by a concentric inner zone and a concentric outer zone, said information carrier comprising a transparent substrate having a readout side and a back side, opposite to said readout side and provided with a reflective coating, characterized in that said carrier comprising means whereby, as seen from the readout side, any light impinging on the outer zone is redirected in such a manner so that optical effects present in said information carrier, which impair the appearance of the information carrier, are at least partially concealed.

2. The information carrier as claimed in claim 1, characterized in that the outer zone on the readout side at least partially in a matt finish.

3. The information carrier as claimed in claim 1, characterized in that the outer zone on the readout side at least partially printed.

4. The information carrier as claimed in claim 1, characterized in that a transition zone is provided between the information zone and the concentric inner and outer zones.

5. An information carrier as claimed in claim 1, characterized in that the back is at least partially in a matt finish.

6. An information carrier as claimed in claim 1, characterized in that the back is at least partially printed.

7. An information carrier as claimed in claim 1, characterized in that a stick-on label is present on the outer zone on the readout side.

8. An information carrier as claimed in claim 1, characterized in that a stick-on label is present on the back.

9. A method for matt-finishing of a molded disc-shaped information carrier optically readable in reflection, provided with an annular information zone bounded by a concentric inner zone and a concentric outer zone and comprising a transparent substrate having a readout side and a back side, opposite to said readout side and provided with a reflective coating, said method comprising providing a matt finish at least partially on at least one of said back and said outer zone of said information carrier by providing a matt finish on corresponding areas of the surface of the mold employed in molding said information carrier.

10. The method as claimed in claim 9, characterized in that the matt-finishing of corresponding zones of a master (4) utilizing a photoresist coating (5) exposed by a signal-modulated laser (6) is achieved by means of special fine matrix exposure of the corresponding zones of the photoresist coating, the zones not involved being simultaneously covered with a mask, and by subsequent development of the exposed photoresist coating in alkali.

11. The method as claimed in claim 9, characterized in that the matt finishing of corresponding zones of a master with a photoresist coating is achieved as follows: while the digital information is being written by exposure of the photoresist coating by means of a signal-modulated laser, the circular outer zone of the photoresist coating is similarly exposed by the same laser which in this case is modulated in its intensity with suitable matt-finishing information and, after the various exposure operations are completed, the photoresist coating is developed in alkali.

12. The method as claimed in claim 11, characterized in that the matt finishing information in the photoresist coating (5) after its development in alkali has a uniform hole matrix with a hole diameter and a distance between holes of the order of a few $\mu$ with a hole depth of approx. $1\mu$.

13. The method of claim 9, wherein the mold is a stamper derived from a master (4) and wherein the corresponding areas of the surface of at least the stamper (9) are provided with a matt-finish.

14. The method of claim 13, wherein the matt finish of the stamper (9) is achieved by etching.

15. The method of claim 13, wherein the corresponding areas of the surface of the master are provided with a matt finish achieved by etching.

16. The method of claim 15, wherein the master (4) is a glass master and etching is carried out with the use of a hydrofluoric/nitric acid mixture and a mask inert to said mixture.

17. The method of claim 13, wherein the matt finish of the stamper is achieved by forming a matt finish coating on said stamper (9).

18. The method of claim 13, wherein the matt finish of the master (4) is achieved by forming a matt finish coating on said master (4).

19. The method of claim 17, wherein the matt finish coating is a matt lacquer.

20. The method of claim 18, wherein the matt finish coating is a matt lacquer.

21. The method of claim 19, wherein the matt lacquer is electrically conductive.

22. The method of claim 20, wherein the matt lacquer is electrically conductive.

23. The method of claim 19, wherein the lacquer is applied by tampon-printing.

24. The method of claim 21, wherein the matt lacquer is applied by tampon-printing.

25. The method of claim 9, wherein the matt finish is achieved by fusion of the relevant surface zones in a matrix pattern by means of a laser (6).

* * * * *

UNITED STATES PATENT AND TRADEMARK OFFICE
CERTIFICATE OF CORRECTION

PATENT NO. : 4,726,006

DATED : February 16, 1988

INVENTOR(S) : Karsten Benne et al.

It is certified that error appears in the above-identified patent and that said Letters Patent is hereby corrected as shown below:

In the Drawings: Figures 10-15 should be added as shown on the attached sheets.

Signed and Sealed this

Twenty-second Day of November, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,726,006

DATED : February 16, 1988

INVENTOR(S) : Karsten Benne et al.

It is certified that error appears in the above-identified patent and that said Letters Patent is hereby corrected as shown below:

In the Drawings: Figures 10-15 are missing from the drawing and should be added as shown on the attached sheets

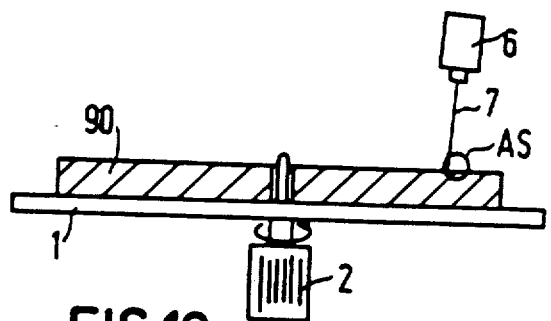
FIG. 10

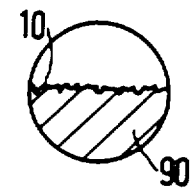
FIG. 11

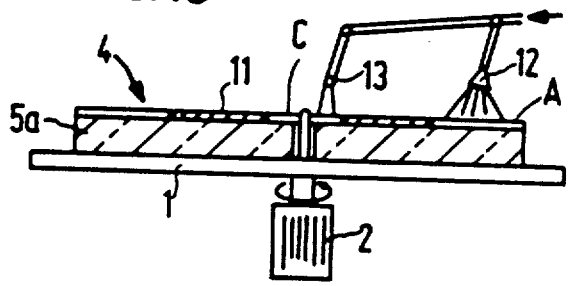
FIG. 12

UNITED STATES PATENT AND TRADEMARK OFFICE
CERTIFICATE OF CORRECTION

PATENT NO. : 4,726,006

DATED : February 16, 1988

INVENTOR(S) : Karsten Benne et al.

It is certified that error appears in the above-identified patent and that said Letters Patent is hereby corrected as shown below:

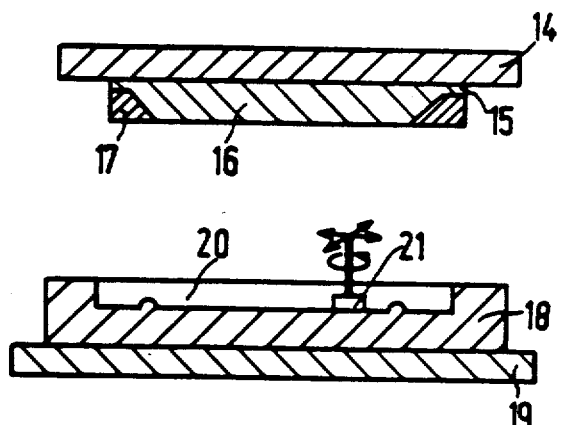

FIG. 13

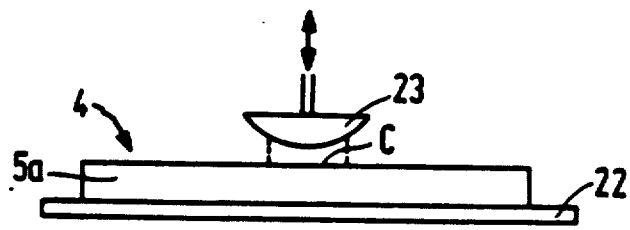

FIG. 14

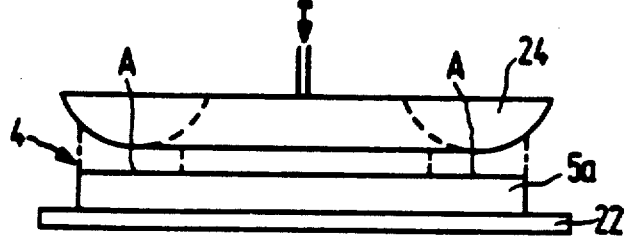

FIG. 15